United States Patent [19]

Lamiaux

[11] Patent Number: 4,768,147
[45] Date of Patent: Aug. 30, 1988

[54] ELECTRIC POWER SUPPLY DEVICE FOR MICROPROCESSORS

[75] Inventor: Sylves Lamiaux, Yerville, France

[73] Assignee: Societe d'Applications Generales D'Electricite, Paris, France

[21] Appl. No.: 784,774

[22] Filed: Oct. 7, 1985

[30] Foreign Application Priority Data

Oct. 15, 1984 [FR] France ................... 84 15758

[51] Int. Cl.⁴ ............................................. G06F 1/00
[52] U.S. Cl. .................................................... 364/200
[58] Field of Search ................................. 371/12; 364/200 MS File, 900 MS File, 707

[56] References Cited

U.S. PATENT DOCUMENTS

| | | | |
|---|---|---|---|
| 4,084,232 | 4/1978 | Woods et al. | 364/200 |
| 4,489,394 | 12/1984 | Borg | 364/900 |
| 4,551,841 | 11/1985 | Fujita et al. | 364/900 |
| 4,586,179 | 4/1986 | Sirazi et al. | 371/12 |
| 4,621,322 | 11/1986 | Suzuki et al. | 364/200 |

OTHER PUBLICATIONS

Patents Abstracts of Japan, vol. 6, No. 30 (P-103)908, Feb. 1982; JP-A-56 149 621 (Tokyo Shibaura Denki K.K.), 19-11-1981.

*Primary Examiner*—Gareth D. Shaw
*Assistant Examiner*—Rebecca L. Adams
*Attorney, Agent, or Firm*—Stevens, Davis, Miller & Mosher

[57] ABSTRACT

A device is provided for supplying microprocessors with electricity, comprising a source for supplying with power microprocessors interconnected by a bus. The source has an initialization output connected directly to a bus so that the microprocessors do not execute their programs during the rise in voltage. Each microprocessor comprises an initialization counter also connected to the bus for recognizing the initialization signal of the source. Each microprocessor also comprises its own initialization generator adapted for detecting an absence of traffic on the bus and for emitting an initialization signal over the bus in the case of "unbuckling" of one of the microprocessors.

6 Claims, 1 Drawing Sheet

ELECTRIC POWER SUPPLY DEVICE FOR MICROPROCESSORS

BACKGROUND OF THE INVENTION

The present invention relates to an electric power supply device for microprocessors connected to an interconnection bus, for series data, comprising at least one power supply source connected by a supply output to supply inputs of the microprocessors and by an initialization output (reset or restart) to initialization inputs of the microprocessors.

The invention applies particularly to the power supply for teleprinter microprocessors.

The power supply voltage of a source is not instantaneously established at its working level. This level is reached, from level 0, after a rise time of the voltage which results in the supply signal having the shape of a ramp of a certain duration. For correct operation it is imperative that the microprocessors only begin executing their programs after this voltage has been established at its working level. This is why microprocessors are initialized, by the initialization signal delivered by the source, only after the voltage has been established at the appropriate level.

Up to now, the signal for initializing microprocessors was delivered by the source over connections connecting the source directly to the microprocessors.

This solution had the disadvantage of having to provide these initialization wires. Now, the less wires there are in a piece of equipment, the better it is.

The present invention aims at overcoming this drawback.

SUMMARY OF THE INVENTION

For this, the present invention provides a power supply device of the above mentioned type, in which the power supply source is connected by its initialization output to the interconnection bus of the microprocessors and the initialization terminals of the microprocessors are also connected to the bus through means adapted for recognizing the initialization signal of the source among the characters flowing over the bus.

The solution provided by the invention is neat because, generally, no character flows over the bus at the moment when the microprocessors are to be initialized. Therefore, the initialization wires of the prior devices have been omitted and replaced by an existing connection which at that time has no function.

In an interesting embodiment of the invention, microprocessors of the device are offset and each provided with its own power source. In this case, the advantage is even greater, since the only common element to the equipment is the interconnection bus.

Advantageously, the power supply source is adapted for emitting an initialization signal in the form of a square wave of a duration greater than all the frames of characters likely to flow over the interconnection bus and the recognition means comprise a counter.

Preferably, the recognition means are integrated in the microprocessors.

Moreover, the microprocessors each advantageously comprise an initialization signal generator adapted for detecting an absence of traffic over the interconnection bus for a predetermined time.

This arrangement advantageously replaces the conventional system called "guard dog", for resolving the problem of "unbuckling" of the microprocessors.

A microprocessor is said to be "unbuckled" when it is no longer operating correctly, even if it is not completely inoperative.

With one of the microprocessors being a master microprocessor and the others slave microprocessors, in the case where one of the slave microprocessors is "unbuckled" the master microprocessor can no longer communicate with it, and, therefore, the master microprocessor emits over the bus, by its initialization generator, a reset signal which resets all the slave microprocessors to a given state, for example to their initial state.

If it is the master microprocessor which is "unbuckled", it is one of the slave microprocessors which, by its initialization generator, will emit an initialization signal.

BRIEF DESCRIPTION OF THE DRAWINGS

The invention will be better understood from the following description of a preferred embodiment of the device of the invention, with reference to the accompanying drawings in which.

DESCRIPTION OF THE PREFERRED EMBODIMENT

Figure 1:
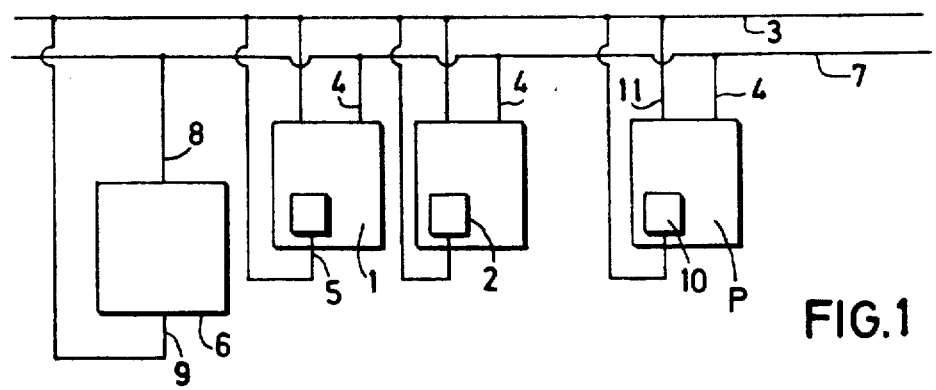
FIG. 1 shows a schematical view of the whole of the device applied to a microprocessor system.

Assuming then in FIG. 1 a system of microprocessors 1, 2, ... P, interconnected by means of connections 11 and a twin wire series data bus 3, each having a power supply input 4 and an initialization input 5. A voltage source 6 is provided for supplying these microprocessors with power, in the case considered at 5 volts, through a supply output 8 and a supply line 7 to which they are connected by their inputs 4.

Through an initialization output 9 source 6 is connected to bus 3 to which the microprocessors are moreover functionally connected by their inputs 5. The initialization inputs 5 are connected to respective initialization counters 10.

Figure 2:
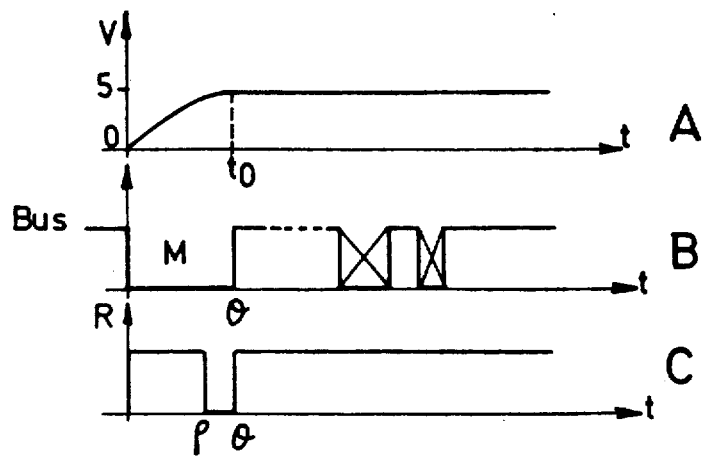
FIGS. 2a, 2b, 2c show respectively the timing diagrams of the power supply voltage, of the signal of the data bus and of the initialization signal.
Figure 3:
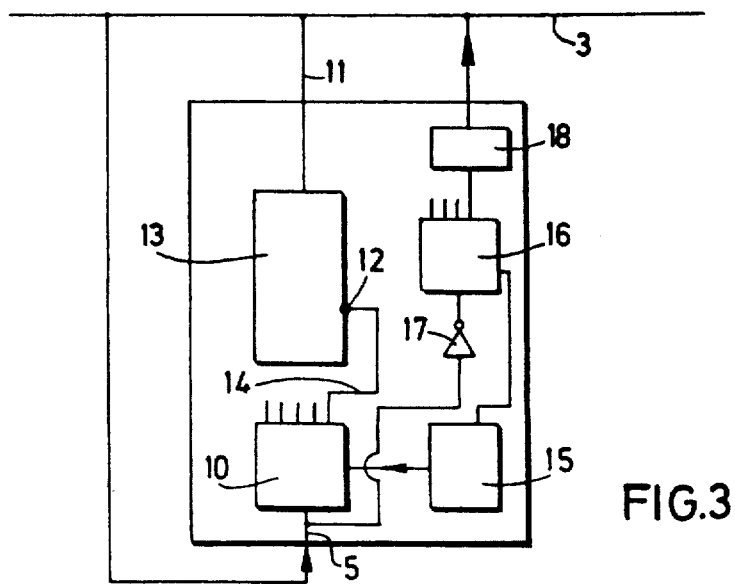
FIG. 3 shows in detail one of the microprocessors of the system.

During the rise times (t, t+to) of the power supply V, which may occur not only on start up of the system but when the power supply source starts up again after a drop or an unforeseen interruption, bus 3 must remain in the "stop" condition, here in the low state, so that the microprocessors which are coupled thereto do not execute their programs. For this, source 6, emits through 9 a holding signal M for holding bus 3 at O. Holding signal M is in the form of a square wave having a duration $\theta$ as shown in FIG. 2. Holding signal M is received at inputs 5 by counters 10. Inputs are in fact the count enabling inputs of counters 10. Reception of signal M at inputs 5 causes a pulse of duration $\theta$ (equal to $\theta-p$) on a "reset" terminal 12 of the active part 13 of the micro processors. Terminals 12 and in fact the real initialization terminals of the microprocessors. The pulse of duration $v$ occurs only after a time duration $p$ which is preset to be equal to the longest duration of the character frames likely to flow over bus 3. The microprocessors are intialized by such pulse.

For providing the function of recognition of the initialization signal, each microprocessor comprises its processing part 13, counter 10 and a clock 15. In actual fact, connection 11 between the microprocessor and bus 3 represents not only the connection between the emitter, not shown, of the microprocessor and bus 3, but also the connection between the receiver, not shown, of the microprocessor and bus 3. Counter 10 receives at its two inputs the connection 5 and the output of clock 15. The reset terminal 12 of part 13 of the microprocessor is connected to one of the outputs of counter 10, that output 14 whose binary weight corresponds to a duration at least equal to $p$.

For providing the guard dog function, each microprocessor further comprises a second counter 16 connected by its inputs to clock 15 and to an inverter 17 itself connected, by its input, to said initialization input 5. The output of counter 16, whose binary weight corresponds to a predetermined duration $\eta$, at least equal to the maximum duration between two frames, is connected to the input of a monostable 18 whose output is connected to bus 3. Counter 16 and monostable 18 form, in the example considered, the above mentioned initialization signal generator.

When after "unbuckling", bus 3 has remained in its state for at least this duration $\eta$, counter 16, through the monostable 18, resets bus 3 to its other state, here the low state: we thus come back to the preceding problem. It is counter 10 which will then provide initialization following the recognition effected as previously.

The implementation of the functions of the invention has been described with reference to particular means. But is should be understood that other means adapted for ensuring these functions remain within the scope of the present invention.

What is claimed is:

1. An electric supply device for microprocessors connected to a series data connection bus having characters within character frames flowing thereover and each microprocessor having a supply input and an initialization input, said device comprising at least one power supply source having a supply output and an initialization output for transmitting an initialization signal, said supply output being connected to said supply input of each of said microprocessors, said initialization output being connected to said bus, each said microprocessor having an associated recognition means connected to said bus for recognizing an initialization signal transmitted over said bus from among said characters, said initialization input of each of said microprocessors being connected to said recognition means.

2. The device as in claim 1, wherein said power supply source comprises means for emitting an initialization signal from said initialization output in the form of a sqaure wave having a duration greater than all said character frames and said recognition means comprises a counter having an input connected to said initialization input.

3. The device as in claim 1, wherein said recognition means is integrated in its associated microprocessor.

4. The device as in claim 1, wherein each of said microprocessors includes an initialization signal generator connected to said bus, responsive to an absence of traffic over said bus for a predetermined time, for emitting an initialization signal to said bus.

5. The device as in claim 4, wherein said initialization signal generator comprises a second counter, an inverter and a monostable, said second counter having an input and an output, said second counter input being connected to said inverter, said inverter being connected to said initialization input, and said second counter output being connected to said monostable which is connected to said bus.

6. The device as in claim 1, wherein said microprocessors are offset and plural power supply sources are provided, one for each of said microprocessors.

* * * * *